C. A. BAKKE.
SAFETY CRANK FOR AUTOMOBILES.
APPLICATION FILED OCT. 22, 1915.
1,189,339.
Patented July 4, 1916.
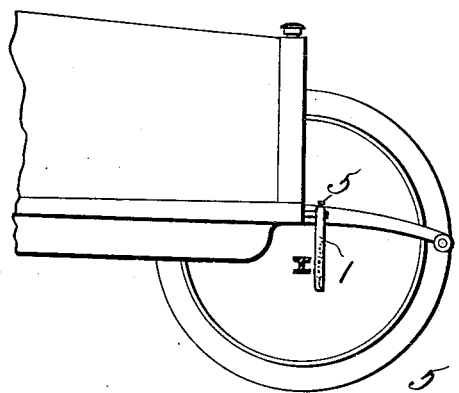
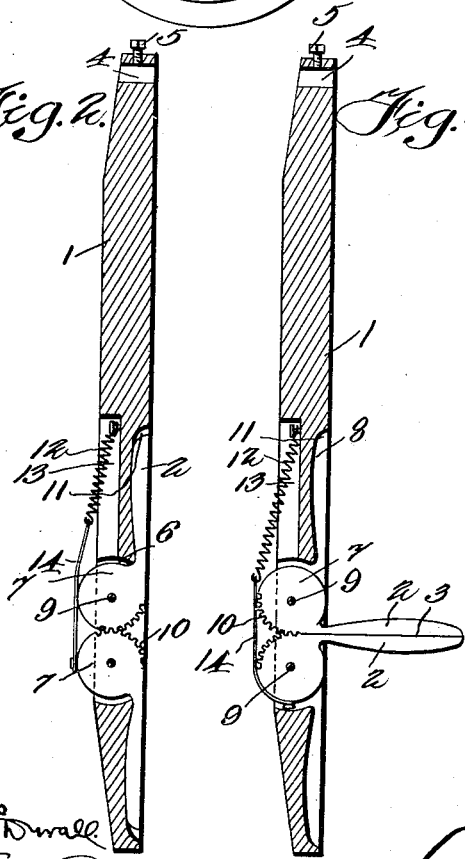
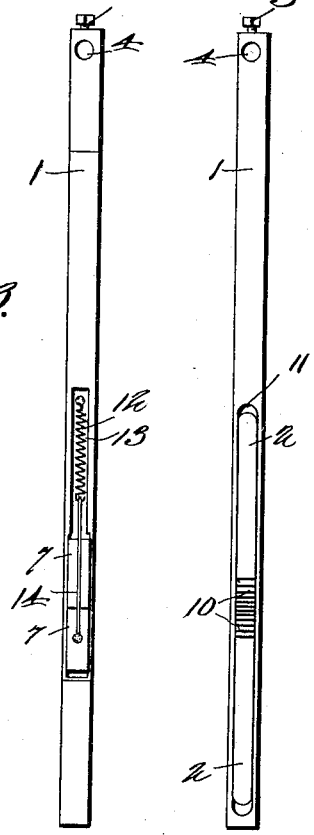
Inventor
C. A. Bakke,

UNITED STATES PATENT OFFICE.

CARL A. BAKKE, OF BISON, SOUTH DAKOTA.

SAFETY-CRANK FOR AUTOMOBILES.

1,189,339.  Specification of Letters Patent.  Patented July 4, 1916.

Application filed October 22, 1915. Serial No. 57,331.

*To all whom it may concern:*

Be it known that I, CARL A. BAKKE, a citizen of the United States, residing at Bison, in the county of Perkins and State of South Dakota, have invented certain new and useful Improvements in Safety-Cranks for Automobiles; and I do hereby declare the following to be a full, clear, and exact description of the invention, such as will enable others skilled in the art to which it appertains to make and use the same.

The invention relates to a safety crank for automobiles.

The object of the present invention is to improve the construction of cranks for automobiles and to provide a simple, practical, inexpensive and efficient safety crank for automobiles adapted to be readily applied to the engine shaft and capable in event of a back firing of the engine of automatically folding the handle portion of the crank within the arm thereof so that the handle portion will be arranged out of the way before the crank makes a complete revolution thereby effectively preventing a person from being injured by the crank.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a side elevation of a portion of an automobile provided with a safety crank constructed in accordance with this invention, parts of the automobile being omitted, Fig. 2 is an enlarged sectional view taken longitudinally of the crank, the handle sections or members being folded within the arm of the crank, Fig. 3 is a similar view the handle sections or members being extended and arranged in opposite position, Fig. 4 is an elevation of the safety crank, the parts being arranged as shown in Fig. 3, Fig. 5 is a similar view the parts being arranged as shown in Fig. 2.

Like numerals of reference designate corresponding parts in the several figures of the drawings.

In the accompanying drawings in which is illustrated the preferred embodiment of the invention, the safety crank comprises in its construction, an arm or bar 1 and a pair of pivoted handle sections or members 2 having straight flat inner edges 3 adapted to fit flat against each other when the handle sections are arranged at right angles to the arm or bar 1 and the other edges or faces of the projecting portions of the handle sections or members are shaped to form a grip or handle when the parts are arranged together as shown in Fig. 3.

The handle sections or members by fitting flat against each other are limited in their relative movement and are maintained rigid with relation to the arm or bar 1 when the said handle sections or members are gripped by the operator.

The arm or bar 1 is provided at its inner end with an opening 4 to receive the shaft of the engine and it is clamped to the same by a set screw 5 but any other suitable means may of course be employed for mounting the safety crank on the shaft of an internal combustion engine, of an automobile.

The arm or bar is provided at its outer portion with a slot 6 to receive heads or gear element 7 of the handle sections or members 2 and it has longitudinal grooves 8 extending from the slot 6 in opposite directions and shaped to conform to the configuration of the handle sections or members to permit the same to fold within the arm or bar 1 in flush relation with the exterior thereof. The flat straight edges or faces 3 are arranged flush with the adjacent face of the arm or bar 1 when the handle sections or members are folded as clearly illustrated in Fig. 3 of the drawings. The heads or gear elements are mounted on suitable pivots 9 and are provided at their adjacent edges with intermeshing teeth 10 which cause the handle sections or members to swing in unison. The intermeshing teeth cause the handle sections or members to move simultaneously in opposite directions when one of the handle members is actuated and the terminals 11 of the grooves 8 are flared and extended beyond the handle sections or members to enable the latter to be readily engaged by the finger of the operator to swing the handle sections or members out of the grooves.

The handle sections or members are positively folded within the grooves when they are free to move by means of a coiled spring 12 secured at one end in a longitudinal recess 13 and connected with a cord or flexible connection 14 of wire or other suitable material secured at one end to the spring and at the other end to the outer gear element or head at the periphery thereof and adapted to rotate the gear elements from the position illustrated in full lines in Fig. 3 of the drawing to that shown in Fig. 2. When the handle sections or members are opened outwardly to the position shown in Fig. 3, the spring is stretched and the tension thereof on the flexible connection 14 is increased and a quick closing of the handle sections or members is assured. Should the engine back fire, the handle sections or members will be jerked out the hands of the operator and will fold within the arm or bar 1 before the crank had made a complete revolution so that there will be no liability of the person cranking the machine being injured by the crank.

What is claimed is:—

1. A safety crank for automobiles including an arm provided with means for securing it to the shaft of an engine, a handle extending from the arm and movably connected therewith and adapted to fold with respect to the arm and means for automatically folding the handle when the same is released.

2. A safety crank for automobiles including an arm or bar, a pair of handle sections or members pivoted to the arm or bar and arranged to fit against each other in an extended position and means for automatically folding the handle sections or members with respect to the bar when the former are released.

3. A safety crank for automobiles including an arm or bar, a pair of handle sections or members pivoted to the arm or bar and arranged to fit against each other in an extended position, and a spring connected with the handle sections or members for automatically folding the same with respect to the arm or bar when the said handle sections or members are released.

4. A safety crank for automobiles including an arm or bar, a pair of pivoted handle members provided at their pivoted ends with gear elements meshing with each other to cause the handle sections or members to move in unison and a spring connected with one of the gear elements for automatically folding the handle sections or members.

5. A safety crank for automobiles including an arm or bar having a slot and provided with grooves extending in opposite directions from the slot, handle sections or members having heads provided with teeth, and meshing with each other, said heads being pivoted in the slot and the handle sections or members being adapted to fold in the said grooves, a spring and a flexible connection secured to the head of one of the handle sections or members and connected with the spring, the latter being adapted to fold the handle sections or members automatically in the said grooves when the handle sections or members are released.

In testimony whereof I affix my signature in presence of two witnesses.

CARL A. BAKKE.

Witnesses:
A. E. HENKELMAN,
E. STENSRUD.

Copies of this patent may be obtained for five cents each, by addressing the "Commissioner of Patents, Washington, D. C."